United States Patent Office 3,088,900
Patented May 7, 1963

3,088,900
SLURRIES FOR USE AS BREEDING MATERIALS IN NUCLEAR REACTORS
Allan Brown, Edgware, Middlesex, and John Jephson Norreys, St. Albans, England, assignors to The General Electric Company Limited, London, England
No Drawing. Filed Jan. 5, 1960, Ser. No. 500
Claims priority, application Great Britain Jan. 14, 1959
7 Claims. (Cl. 204—193.2)

This invention relates to slurries for use as breeding materials in nuclear reactors.

A breeding material is a, co-called "fertile" material used to produce a fissile material which can be used as a fuel in nuclear reactors. Only one readily available fissile material occurs extensively in nature, this being $U^{235}$, but this constitutes only approximately 0.7 percent of natural uranium. On the other hand, thorium, which is available naturally to about three times the extent of uranium, is a fertile material from which fissile $U^{233}$ may be derived, the reaction being as follows:

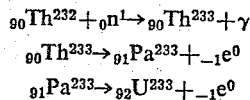

Thorium is therefore probably the most plentiful source of supply of potentially fissionable material.

A reactor may be designed so that loss of neutrons from the fission of its fuel is so low that neutrons, over and above those necessary to maintain the main reaction, are available for transmutation of thorium arranged within the reactor for that purpose. It can moreover be arranged that more fissile material is produced by this transmutation process that the fuel consumed by the reactor. Such a reactor is a "breeder" reactor and the transmutable material is included in the core, for example when the fuel is natural uranium, or it may be arranged in the form of a blanket surrounding or partly surrounding the core.

In nuclear reactors in general, the maintenance of a nuclear chain reaction depends primarily upon the presence of a critical mass of fissile material within a particular volume, so that essentially it is immaterial whether the fuel is in solid or fluid form. There are certain advantages, however, in the use of fluid fuels; the fuel in this state suffers little from radiation damage and the continuous removal of fission products from the fuel is made possible or facilitated. Although uranium itself, for example, could be employed in its fluid state, the high melting point of uranium (c. 1133° C.) renders the choice of suitable constructional materials particularly difficult and, in consequence, it has been proposed to employ a fuel system which is fluid at a lower temperature by combining uranium metal with metals or alloys, such as bismuth, lead or bismuth-lead alloy, which have low melting points. If the uranium is sufficiently "enriched" in respect of the fissile isotope $U^{235}$, a solution or slurry of one percent by weight of uranium in bismuth is amply sufficient for the maintenance of a chain reaction.

In a similar way, it may be desirable to use fertile material in fluid form in a breeder reactor, so that the converted fertile material may be removed in a comparatively simple manner. The melting point of thorium is however very high (c. 1690° C.) and thorium cannot be used in the fluid state for the same reasons which prevent uranium being used in this state. Attempts to produce slurries containing thorium, such as by combination with the lower melting point metals and alloys above referred to, have not been successful, since on the one hand metallic thorium forms a compound $ThBi_2$, with bismuth and this compound tends to separate out from a slurry containing it in a manner which is markedly temperature dependent; and metallic thorium is therefore inconvenient in use.

In attempting, as an alternative, to form a slurry using the oxide of thorium, thoria, and to derive a system which is fluid at temperatures much lower than the melting point of thorium, workers in this field have encountered serious difficulties, mainly associated with the non-wetting of thoria particles by the bismuth or bismuth containing alloy. Proposals, such as those disclosed in our copending patent application No. 745,814, have been made to overcome such difficulties, but this alternative still presents production problems.

An object of the present invention is to provide yet another alternative solution to the problem of producing a satisfactory slurry of this kind. The solution arises out of our discovery of a new phase of an intermetallic compound of thorium and silicon which is particularly stable in molten bismuth or bismuth-containing alloys.

According to one aspect, the invention consists in the true β-phase of thorium disilicide, an intermetallic compound of thorium and silicon containing 66.7 at. percent silicon.

This β-phase is not to be confused with the "β-phase" referred to in the literature at this date. Thus $ThSi_2$, thorium disilicide, was first described by Brauer and Mitius (Z. anorg. Chem., 249, 325, 1942), who isolated single crystals and reported the crystal structure to be tetragonal with the space group I4/amd. Later, Zachariasen (Acta Cryst. 2, 94, 1948) described an isostructural uranium disilicide observed initially during metallurgical examinations by Kaufmann, Cullity and Bitsianes (Trans. A.I.M.E., 209, 203, 1957). Another phase thought by Kaufmann et al. to be $U_2Si_3$ and also studied by Zachariasen, was found to have an hexagonal crystal structure of the $AlB_2$-type, space group C6/mmm. The crystal structure data led Zachariasen to suggest that this structure was a second form of uranium disilicide and he designated it β-$USi_2$. The tetragonal uranium and thorium disilicides accordingly became the alpha forms.

More recently Jacobson, Freeman, Tharp and Searcy obtained a thorium silicide isostructural with Zachariasen's β-$USi_2$, but they observed that the silicon content was lower than that of α-$ThSi_2$. They used the description "β$ThSi_2$" but suggested that the true composition was $ThSi_{1.5 \pm 0.2}$.

We have prepared all the above phases by arc-melting and have examined them by metallographic and X-ray diffraction techniques. A notable feature of the preparations is the formation of "β-$ThSi_2$" from a mixture containing 62–63 at. percent silicon, compared with the 66.7 at. percent required for the formation of the α-disilicide. The composition of Jacobson et al.'s so called "β-phase" accordingly appears to be $Th_3Si_5$ and the values of the structure cell dimensions we have found to be:

$a_0 = 3.985 \pm 0.001$ A., $c_0 = 4.228 \pm 0.001$ A.

During an investigation into reactions between the silicides of thorium and liquid bismuth, we have discovered the new phase. X-ray analysis shows that its structure is hexagonal with space group C6/mmm, and like the $Th_3Si_5$ compound, is of the $AlB_2$-type, but the structure cell dimensions of the new phase are different and in particular the axial ratio $$\frac{c}{a}$$

is less than unity in contra-distinction to the $Th_3Si_5$ compound. Thus the dimensions we have found to be:
$a_0=4.136\pm0.001$ A., $c_0=4.126\pm0.001$ A.

We find that this new phase results from heat treatment of $\alpha$-$ThSi_2$ at a temperature in the region of about 700–1050° C. We have also found that heat treatment of the new phase at temperatures in the range 1200–1300° C. transforms it to $\alpha$-$ThSi_2$, and we, therefore, conclude that the new phase is the true beta phase of this intermetallic.

The known alpha-phase of this compound may be prepared by arc melting under a non-reactive atmosphere, such as argon, or by sintering a mixture of the constituents in powder form and in substantially the correct atomic proportions at about 1400–1600° C. The heat treatment to form the new phase is preferably carried out in vacuo, or in an inert atmosphere, and the duration of the treatment should be a minimum period depending upon the temperature, the period being shorter for the higher temperatures. We have found, for example, that about 4 hours is sufficient at about 850° C.

Using this new phase of thorium disilicide, we have successfully produced slurries in bismuth or bismuth/lead alloy matrices which have proved to be stable enough to form useful breeding materials for a nuclear reactor.

According to another aspect of the invention, therefore, a breeding material comprises the true $\beta$-phase of thorium disilicide as a suspension in a suitable medium such as a bismuth or bismuth-containing alloy matrix.

The concentration of the disilicide in the slurry will depend upon the application envisaged. Although it is advantageous to have a very mobile fluid slurry for certain purposes, the concentration of thorium may be much higher if, for example, the slurry is to be canned, or alternatively if it is desired to use intermittent feed through channels provided in the blanket region of the reactor, in which case a viscous slurry may be useful, in that it can be rammed part way through the channel before treatment and right through after irradiation.

We have also found that we can prepare a satisfactory slurry by heating a mixture of thorium and silicon powders in the proportion near 66.7 at. percent silicon in a bismuth or bismuth-containing alloy matrix in a non-reactive atmosphere or in vacuo. The range of temperature for such treatment will be about 700–1050° C. and at 750° C. we have found that a satisfactory slurry results after about 40 hours during which time the mixture is continuously agitated.

It will be apparent that it is not always possible to ensure that the exact quantities of constituents are present to give the correct atomic proportions in the mixtures referred to. It will therefore be preferable for the mixture to tend towards a slight excess of silicon, above the required atomic proportions. This is because, if there were excess thorium, thorium bismuthide would separate out and this, being subject to grain growth, could lead to clogging of the circulating system of the slurry. On the other hand, although silicon will not dissolve to any great extent in the matrix, it is stable over a wider temperature range and will not give rise to this disadvantage. It could moreover be removed as necessary.

We claim:

1. An intermetallic compound of thorium and silicon containing substantially 66.7 at. percent silicon and having a hexagonal crystal structure with space group C6/mmm and structure cell dimensions $a_0=4.136\pm.001$ A. and $c_0=4.126\pm.001$ A.

2. A method of preparing an intermetallic compound of thorium and silicone which comprises heat treating a mixture of thorium and silicon containing substantially 66.7 at. percent silicon at a temperature above about 1400° C. in a non-reactive atmosphere to produce the $\alpha$-phase of thorium disilicide, and heat treating this product at a temperature in the range about 700° C.–1050° C. until the structure cell dimensions are $a_0=4.136\pm.001$ A. and $c_0=4.126\pm.001$ A.

3. The method of preparing an intermetallic compound of thorium and silicon which comprises heat treating a mixture of thorium and silicon containing substantially 66.7 at. percent silicon at a temperature above about 1400° C. in a non-reactive atmosphere to produce the $\alpha$-phase of thorium disilicide, and heat treating this product at a temperature of about 850° C. for about four hours.

4. The method of preparing a slurry as claimed in claim 6 wherein the heat treatment is carried out at a temperature of about 750° C. for a period of approximately forty hours.

5. A method of preparing a slurry as claimed in claim 6 wherein the said mixture of thorium and silicon is arranged to contain a slight excess of silicon.

6. A method of preparing a slurry for use as a breeding material in a nuclear reactor which consists in forming a suspension of a mixture of thorium powder and silicon powder containing substantially 66.7 at. percent silicon in a liquid medium consisting essentially of molten bismuth, and heating the said suspension at a temperature in the range of 700° C. to 1050° C. until the said mixture of thorium and silicon has combined to form, in suspension in said liquid medium, an intermetallic compound having a hexagonal crystal structure with space group C6/mmm and structure cell dimensions $a_0=4.136\pm.001$ A. and $c_0=4.126\pm.001$ A.

7. A nuclear breeding material in the form of a slurry consisting of a suspension of an intermetallic compound of thorium and silicon, containing substantially 66.7 at. percent silicon and having a hexagonal crystal structure with space group C6/mmm and structure cell dimensions $a_0=4.136\pm.001$ A. and $c_0=4.126\pm.001$ A., in a liquid metal medium consisting essentially of molten bismuth.

References Cited in the file of this patent

UNITED STATES PATENTS 2,915,445    Bryner _____ Dec. 1, 1959

OTHER REFERENCES

BMI-1300, Constitution of Uranium and Thorium Alloys, by Rough et al., June 2, 1958, pages 127–128.